A. NELSON.
SAWING APPARATUS.
APPLICATION FILED JUNE 1, 1915.
1,198,371.
Patented Sept. 12, 1916.
2 SHEETS—SHEET 1.
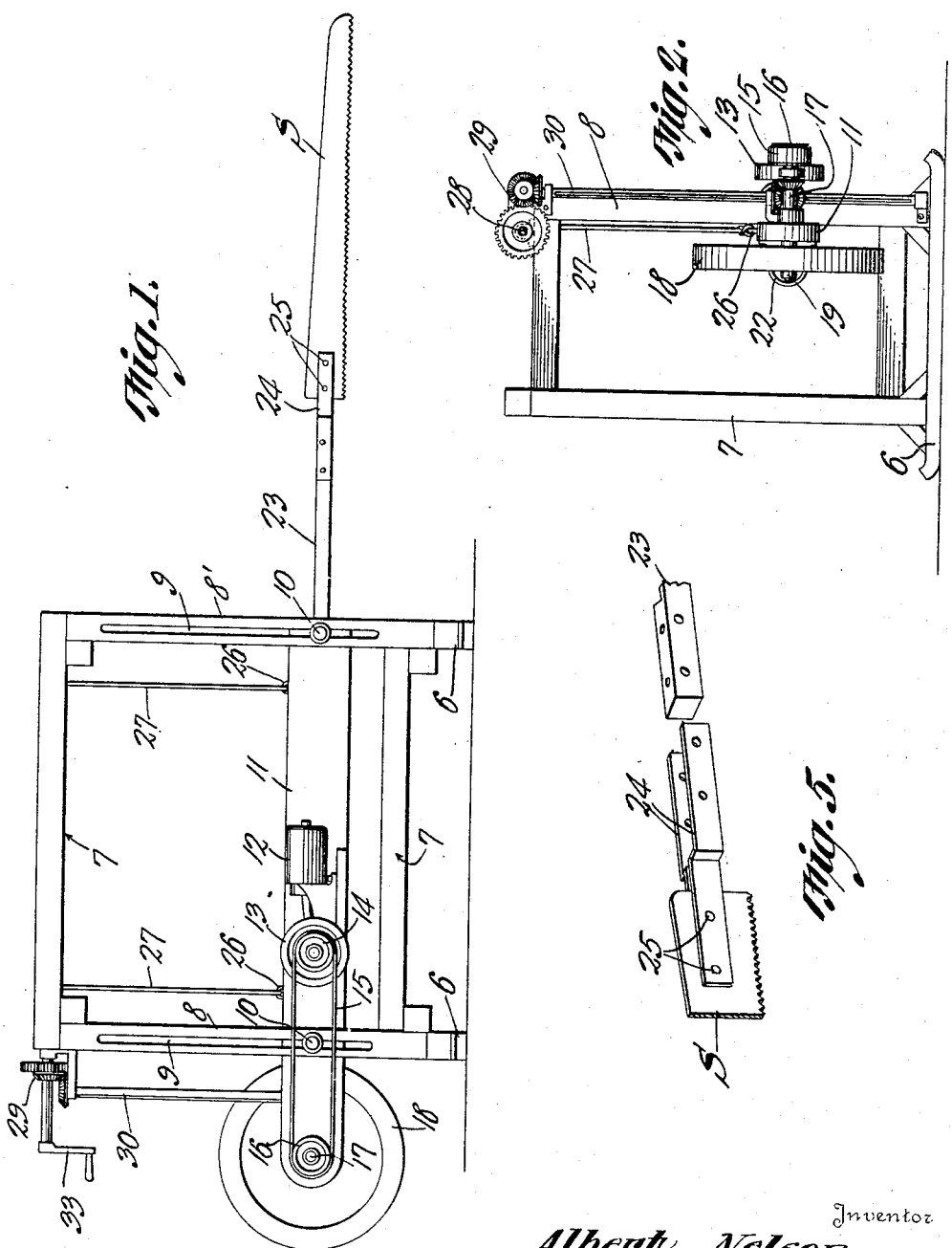
Inventor
Albert Nelson
By  [signature]
Attorney

A. NELSON.
SAWING APPARATUS.
APPLICATION FILED JUNE 1, 1915.

1,198,371.

Patented Sept. 12, 1916.
2 SHEETS—SHEET 2.

Inventor
Albert Nelson

By David P. Moore,
Attorney

UNITED STATES PATENT OFFICE.

ALBERT NELSON, OF ROCKFORD, IOWA.

SAWING APPARATUS.

1,198,371. Specification of Letters Patent. Patented Sept. 12, 1916.

Application filed June 1, 1915. Serial No. 31,418.

*To all whom it may concern:*

Be it known that I, ALBERT NELSON, a citizen of the United States, residing at Rockford, in the State of Iowa, have invented certain new and useful Improvements in Sawing Apparatus, of which the following is a specification.

This invention relates to improvements in sawing apparatus, one object of the invention being the provision of a novel mechanism operated by a motor, preferably an explosive engine, such mechanism being portable so that it can be readily moved from one log to another in the forest, or where used for felling trees, it can be readily moved from one tree to another.

A further object of the present invention is the provision of a sawing apparatus, in which the saw is properly reciprocated, and also is permitted the necessary rise and fall to accommodate for the cut during its reciprocation, and its return for starting a new cut.

A still further object of the present invention is the provision of a sawing machine, whereby as the saw is reciprocated to make a cut, the saw is consonantly lowered so that the maximum cut at each movement of the saw may be obtained.

With the foregoing and other objects in view and which will appear as the description proceeds, the invention resides in the novel features hereafter described and claimed, it being well within the scope of the invention to make changes in the details.

Figure 3:
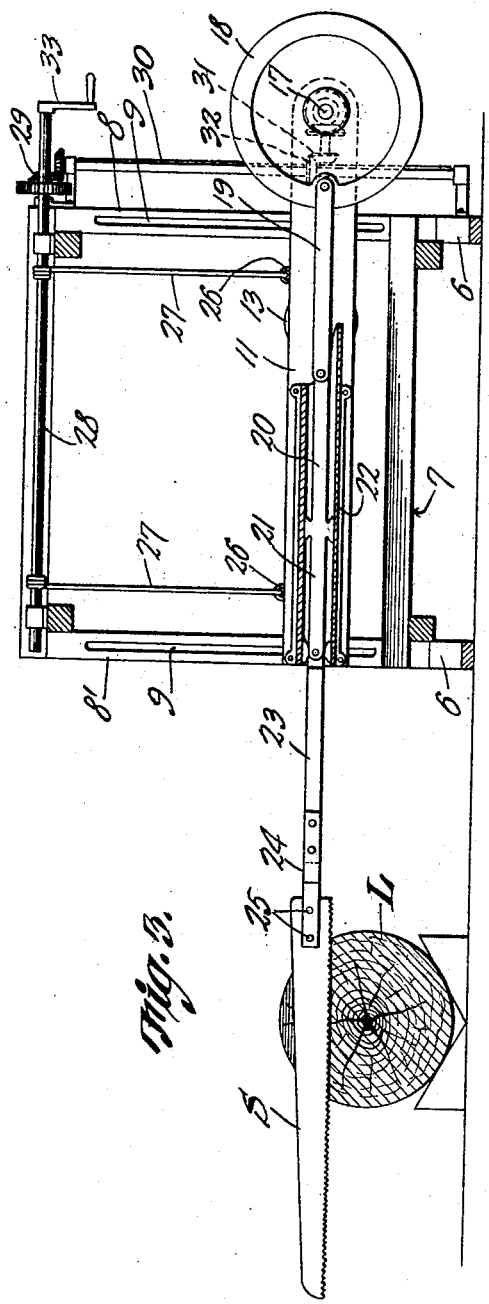
Figure 4:
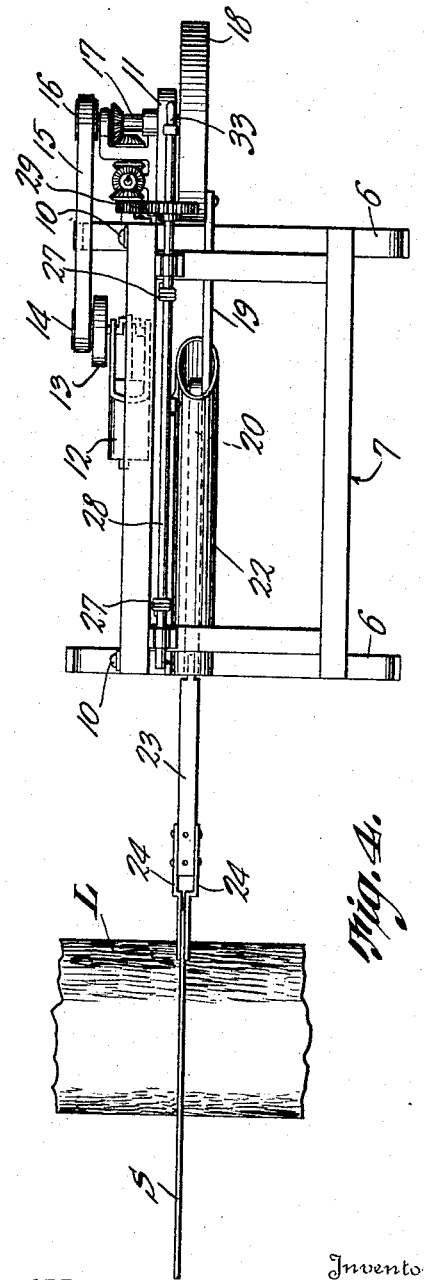

In the accompanying drawings: Figure 1 is a side elevation of the complete apparatus. Fig. 2 is an end view taken from the left as viewed in Fig. 1. Fig. 3 is a view taken from the opposite side to Fig. 1, portions being shown in section. Fig. 4 is a top plan view of the complete apparatus. Fig. 5 is a detail view of the saw connection.

Referring to the drawings, the numeral 6, designates the skids that support the frame 7. The two vertical posts 8 and 8' of the frame are longitudinally slotted as at 9, for the sliding reception of the bolts 10, which in turn, slidably attach the support 11 to the frame. Such a connection permits the support to rise and fall in the frame, the rise being accomplished to elevate the saw S, at the beginning of the cut, and the fall to permit the saw to lower during the sawing operation. The explosive engine 12 is mounted in and bodily carried by the support, and its fly wheel 13, carries a belt pulley 14, over which is trained the belt 15, which in turn is trained over the belt pulley 16, carried by the shaft 17, journaled in the far end of the support, and carrying the large wheel 18. By this means the wheel 18 is rotated by the engine. A pitman 19 is connected eccentrically to the wheel 18 at the opposite side to the pulley 16, and has its opposite end connected to the rod 20, which in turn is connected to the guided slide 21, mounted in the guiding casing 22, which in turn is carried by the support 11. A connecting bar 23 is connected to the slide 21 and carries at its free end the two saw attaching plates 24, which are connected to the saw S by a fragile or breakable connection 25, so the saw will not be injured in a jam, but will be automatically disconnected by the plates 24 when any undue strain is placed upon the connection during the sawing operation.

In order to automatically lower the support 11 and all the parts carried thereby, during the time that the saw is being reciprocated and therefore producing a cut in the log L, there are attached to the two eyes 26 the two cables 27, which in turn are connected to the horizontal shaft 28, journaled in the frame, and extended to have its gearing 29, operably connected to the shaft 30, which in turn is operably connected to the shaft 17 through the fixed gear 31 and the slidingly mounted splined gear 32. A crank 33 is also provided to manually elevate the support 11 by rotating the shaft 28 to wind up the cables instead of release them.

From the foregoing it will be seen that the saw S is properly positioned upon the log by adjustability of the support 11, and then the engine is started and through the pitman 19 and wheel 18, the desired reciprocatory movement is imparted to the saw, while simultaneously therewith the shaft 28 is rotated to lower the support 11 and consequently the saw, so that the saw is always maintained in desirable position for producing the cut in the log, it being lowered upon the work during the cutting operation.

Where the saw is used upon standing trees, the connection 24 is turned and the saw is placed in a horizontal, instead of a vertical position, as illustrated.

What I claim as new is:—

A sawing apparatus comprising a supporting frame, having vertical slotted members, a carrier board having slidable connection in the slots in said members, a tubular housing mounted on one side of the board, a throw rod reciprocatingly movable in the housing, a saw blade operated by the rod, raising and lowering means on the frame and connected with the board, a motor carried by the board and disposed on the side thereof opposite the housing, a fly wheel journaled on the board and having eccentric connection with the throw rod, a vertical shaft journaled on the frame, a gear rotatable with the shaft and slidable thereon, and driven by the journal of the fly wheel, and gear connections between the shaft and the raising and lowering means.

In testimony whereof I affix my signature in presence of two witnesses.

ALBERT NELSON.

Witnesses:
 JUNE LORENZ,
 HAZEL MOORE.